(12) United States Patent
Zhang et al.

(10) Patent No.: US 12,665,469 B2
(45) Date of Patent: Jun. 23, 2026

(54) MOTOR AND BLOW DEVICE USING THE SAME

(71) Applicant: Shenzhen Xiaoti Dazuo Technology Co., Ltd., Shenzhen (CN)

(72) Inventors: Ruibo Zhang, Shenzhen (CN); Fan Yang, Shenzhen (CN); Bo Sun, Shenzhen (CN)

(73) Assignee: Shenzhen Xiaoti Dazuo Technology Co., Ltd., Shenzhen (CN)

( * ) Notice: Subject to any disclaimer, the term of this patent is extended or adjusted under 35 U.S.C. 154(b) by 203 days.

(21) Appl. No.: 18/605,565

(22) Filed: Mar. 14, 2024

(65) Prior Publication Data

US 2024/0313619 A1     Sep. 19, 2024

(30) Foreign Application Priority Data

Mar. 17, 2023 (CN) .......................... 202320524615.9
Jan. 31, 2024 (CN) .......................... 202410145131.2

(51) Int. Cl.
*H02K 9/06* (2006.01)
*F04D 25/08* (2006.01)

(52) U.S. Cl.
CPC ............. *H02K 9/06* (2013.01); *F04D 25/082* (2013.01)

(58) Field of Classification Search
CPC ......... H02K 9/06; H02K 5/207; F04D 25/082
USPC ........................................................ 310/60 R
See application file for complete search history.

(56) References Cited

U.S. PATENT DOCUMENTS

2010/0283340 A1 * 11/2010 Fradella ................. H02K 7/025
                                                                310/90.5
2015/0061429 A1 * 3/2015 Sakai ....................... H02K 9/06
                                                                310/63

FOREIGN PATENT DOCUMENTS

WO     WO-2022025363 A1 * 2/2022 ............... H02K 9/06

OTHER PUBLICATIONS

English Translation of WO2022025363A1 (Year: 2022).*

* cited by examiner

*Primary Examiner* — Terrance L Kenerly
*Assistant Examiner* — Theodore L Perkins

(57) ABSTRACT

A motor includes: an air guide member having a plurality of first air channels to form an air guide area; a stator assembly having a plurality of second air channels to form a heat dissipation area; a housing having an receiving cavity to receive the stator assembly and air guide member; an air outlet member connected to the housing having an outlet area; a rotor rotatably arranged within the stator assembly; a preload support assembly having a first preload unit and a second preload unit respectively located on both sides of the stator assembly, the first preload unit and the second preload unit are both connected to the shaft to form opposing forces; and an impeller arranged on one side of the air guide member; the air guide area, the heat dissipation area and the outlet area together form an only air channel of the motor.

17 Claims, 7 Drawing Sheets

MOTOR AND BLOW DEVICE USING THE SAME

CROSS-REFERENCE TO RELATED APPLICATION

The present application claims foreign priorities of Chinese Patent Application No. 202410145131.2, filed on Jan. 31, 2024, and Chinese Patent Application No. 202320524615.9, filed on Mar. 17, 2023, the entire contents of which are hereby incorporated by reference.

TECHNICAL FIELD

The present disclosure relates to a technical field of motor, and more particularly to a motor and a blow device.

BACKGROUND

With the development of technology and life, motor has become a necessary power component for many electronic products. For example, the motor can be used as a source of wind power for a blower device. The performance of the motor also largely determines the performance of the blower.

However, when the size of the motor is fixed, performance of wind power and heat dissipation are often difficult to meet the requirements. When the performance wind power and heat dissipation need to meet the requirements of the electronic product, it is usually necessary to choose a larger motor, thereby increasing the overall volume of the product. Therefore, it is necessary to develop a motor that takes into account various indicators such as size, wind power, and heat dissipation.

SUMMARY

In order to overcome the defect as aforementioned, the purpose of the present disclosure is to provide a motor and a blow device.

In first aspect of the present disclosure, a motor is provided, the motor includes: an air guide member having a center frame and a plurality of air guide fins arranged at intervals on outer periphery of the center frame, each two adjacent air guide fins define a first air channel, a plurality of the first air channels form an air guide area; a stator assembly having a stator yoke and a plurality of stator teeth, the stator teeth are connected to inner wall of the stator yoke and are arranged at intervals along circumferential direction of the stator yoke, each two adjacent stator teeth define a second air channel, a plurality of the second air channels form a heat dissipation area; a housing having an receiving cavity extending through axial direction of the motor to receive the stator assembly and the air guide member; an air outlet member located at an end of the stator assembly away from the air guide member and connected to the housing, the air outlet member having an outlet area; a rotor rotatably arranged within the stator assembly, the rotor having a shaft, one end of the shaft is extended from the stator assembly and passed through the air guide member, another end of the shaft is extended from the stator assembly and passed through the air outlet member; a preload support assembly having a first preload unit and a second preload unit respectively located on both sides of the stator assembly, the first preload unit and the second preload unit are both connected to the shaft to form opposing forces; and an impeller arranged on the side of the air guide member away from the stator assembly and connected to the shaft, wherein the ratio of the maximum diameter of the inner wall of the stator yoke to the maximum outer diameter of the impeller is between 0.8-1.2; wherein the air guide area, the heat dissipation area and the outlet area together form an only air channel of the motor, air flow generated by the driven impeller is guided by the air guide area and completely passed through the heat dissipation area, and flowed out from the outlet area.

In some embodiments, the first preload unit and the air outlet member are arranged on the same side of the stator assembly, the first preload unit includes an elastic member and a first bearing arranged on the shaft, one end of the elastic member is resisted the air outlet member, another end of the elastic member is resisted the first bearing.

In some embodiments, the first bearing comprises an inner part, an outer part and balls arranged between the inner part and the outer part, the inner part is fixed on the shaft, the end of the elastic member is resisted the outer part.

In some embodiments, the air outlet member comprises a center seat, the outlet area is distributed around the center seat, the side of the center seat facing the stator assembly is provided with an accommodating groove, the elastic member is received in the accommodation groove.

In some embodiments, the air outlet member comprises a shell connected to the housing and a plurality of support parts connected between the shell and the center seat, the support parts are arranged at intervals along the circumferential direction of the center seat, each two adjacent support parts define a outlet, a plurality of the outlets form the outlet area.

In some embodiments, the second preload unit and the air guide member are arranged on the same side of the stator assembly, the second preload unit includes a second bearing arranged on the shaft, the side of the second bearing away from the stator assembly is resisted the air guide member.

In some embodiments, the second preload unit comprises a third bearing located on a side of the second bearing facing the stator assembly, the third bearing is disposed adjacent to the second bearing along the axial direction of the shaft.

In some embodiments, a receiving groove is opened on side of the center frame facing the stator assembly, the second bearing and the third bearing are both located in the receiving groove.

In some embodiments, the stator assembly comprises a plurality of stator windings around the stator teeth in one-to-one correspondence, cross-sectional area of one stator tooth wound by the stator winding is less than or equal to one-half of cross-sectional area of flow channel formed between two adjacent stator teeth wound by the stator winding.

In some embodiments, the air outlet member comprises a center seat, shell and a plurality of support parts connected between the shell and the center seat, each two adjacent support parts define a outlet, the number of the stator teeth is 6, the number of air guide fins is between 6 and 12, and the number of support parts is between 2 and 6.

In some embodiments, a first position part is arranged on inner wall of the end of the housing away from the air guide member, a second position part is arranged on outer wall of the stator yoke, the stator assembly is positioned in the housing through the nesting of the first position part and the second position part.

In some embodiments, the first position part is a position slot which is arranged along axial direction of the housing, the second position part is a position protrusion which is protruding along the axial direction of the rotor.

In some embodiments, length of the position protrusion is less than or equal to length of the position slot.

In some embodiments, the air guide fins are arranged at least partially inclined on outer wall of the center frame relative to the axial direction of the center frame.

In some embodiments, inclination of part of the air guide fin adjacent to the impeller is greater than inclination of part of the air guide fin adjacent to the stator assembly.

In some embodiments, the air guide member and the housing are integrated, end of the air guide fin away from the center frame is connected to inner wall of the housing.

In some embodiments, the housing comprises a first housing part configured to accommodate the air guide member and a second housing part configured to accommodate the stator assembly, the outside diameter of the first housing part is less than the outside diameter of the second housing part.

In some embodiments, the stator assembly comprises a plurality of the stator windings wound around the stator teeth in one-to-one correspondence, ratio of length of the stator teeth along the radial direction of the stator yoke to width of the stator windings along the circumference of the stator yoke is greater than or equal to 2.

In some embodiments, the shell is connected with the housing by means of thread or snap.

In second aspect of the present disclosure, a blow device includes: a mounting case; and a motor arranged in the mounting case; wherein the motor comprises: an air guide member having a center frame and a plurality of air guide fins arranged at intervals on outer periphery of the center frame, each two adjacent air guide fins define a first air channel, a plurality of the first air channels form an air guide area; a stator assembly having a stator yoke and a plurality of stator teeth, the stator teeth are connected to inner wall of the stator yoke and are arranged at intervals along circumferential direction of the stator yoke, each two adjacent stator teeth define a second air channel, a plurality of the second air channels form a heat dissipation area; a housing having an receiving cavity extending through axial direction of the motor to receive the stator assembly and the air guide member; an air outlet member located at an end of the stator assembly away from the air guide member and connected to the housing, the air outlet member having an outlet area; a rotor rotatably arranged within the stator assembly, the rotor having a shaft, one end of the shaft is extended from the stator assembly and passed through the air guide member, another end of the shaft is extended from the stator assembly and passed through the air outlet member; a preload support assembly having a first preload unit and a second preload unit respectively located on both sides of the stator assembly, the first preload unit and the second preload unit are both connected to the shaft to form opposing forces; and an impeller arranged on the side of the air guide member away from the stator assembly and connected to the shaft; wherein the air guide area, the heat dissipation area and the outlet area together form an only air channel of the motor, air flow generated by the driven impeller is guided by the air guide area and completely passed through the heat dissipation area, and flowed out from the outlet area.

When the motor of the present application is running, the shaft rotates relative to the stator assembly under the interaction between the rotor and the stator assembly, so that the impeller is driven to rotate by the shaft. The rotation of the impeller generates air flow from outside of the motor into the inside of the motor, the air flow is guided through the air guide area, and then flows toward the stator assembly and passes through the heat dissipation area, the heat generated by the stator assembly is dissipated from the outlet area. By setting the ratio of the maximum diameter of the inner wall of the stator yoke to the maximum outer diameter of the impeller between 0.8 and 1.2, under the condition that the size of the housing remains unchanged, it is ensured that the diameter of the edge of the second air channel is equivalent to the edge of the impeller, which can make the air flow completely flow to the heat dissipation area by the guiding of the air guide area to reduce the waste of wind power. It is also helps to improve heat dissipation effect of the motor and effectively increases the power of the motor.

BRIEF DESCRIPTION OF THE DRAWINGS

In order to illustrate the technical solutions in the embodiments of the present disclosure more clearly, the drawings required to be used in the description of the embodiments will be briefly described below. It is obvious that the drawings in the following description are only some embodiments of the present disclosure. For one of ordinary skill in the art, other drawings may also be obtained according to these drawings without paying any creative effort.

DETAILED DESCRIPTION

Figure 1:
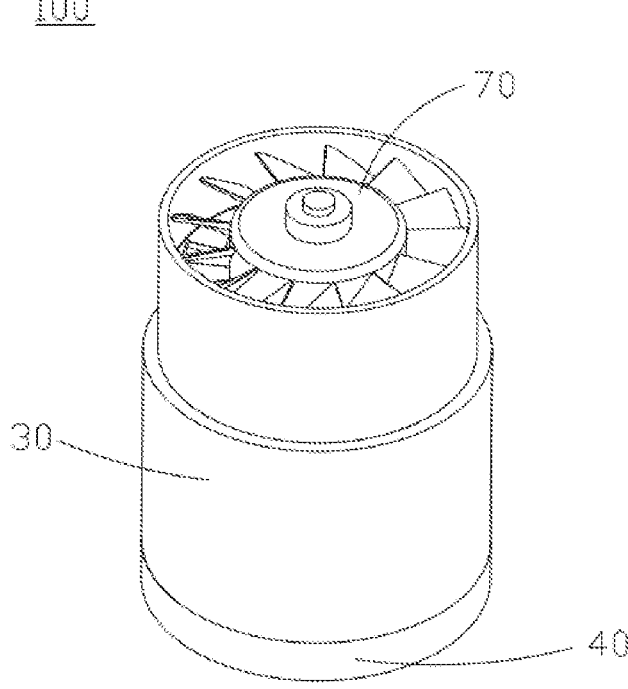
FIG. 1 is a structural diagram of a motor according to an embodiment of the present application.
Figure 2:
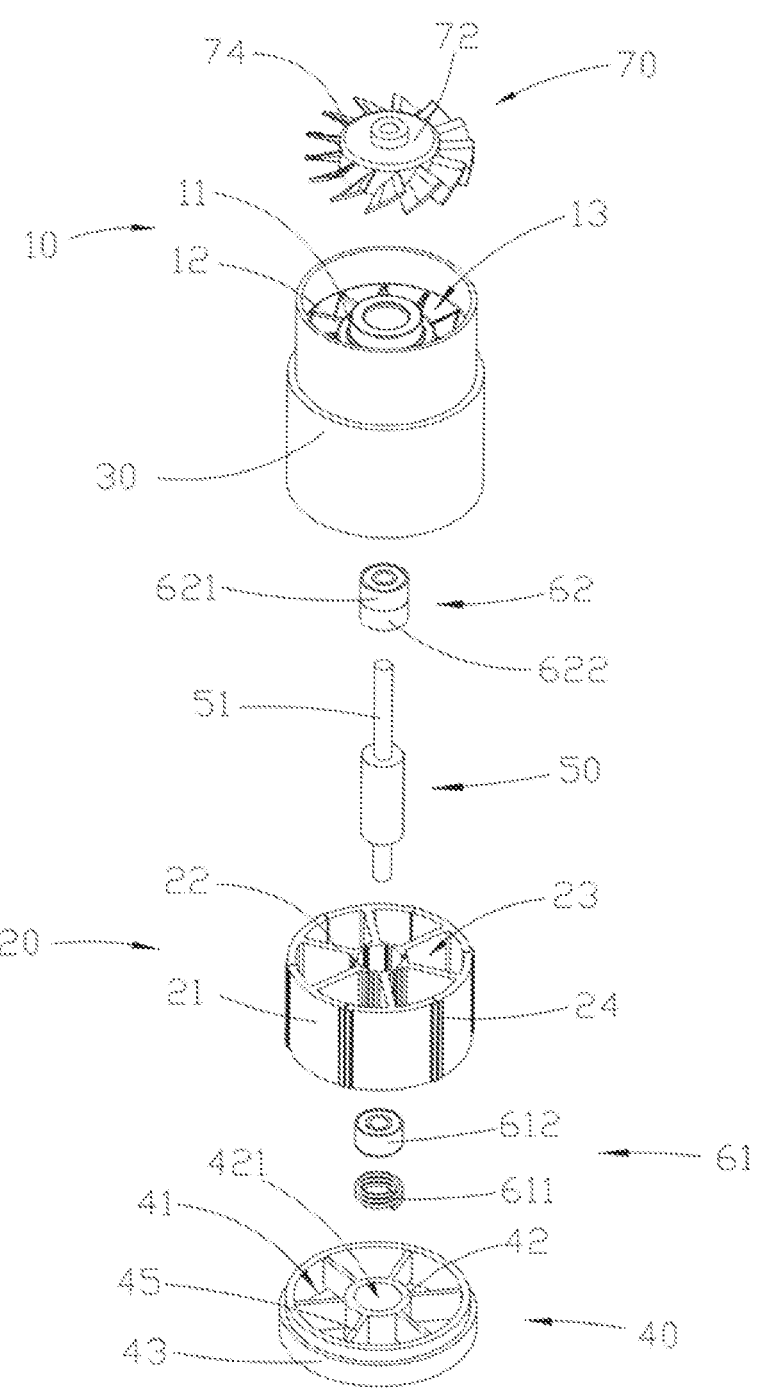
FIG. 2 is an explosion diagram of the motor in one direction as shown in FIG. 1.
Figure 3:
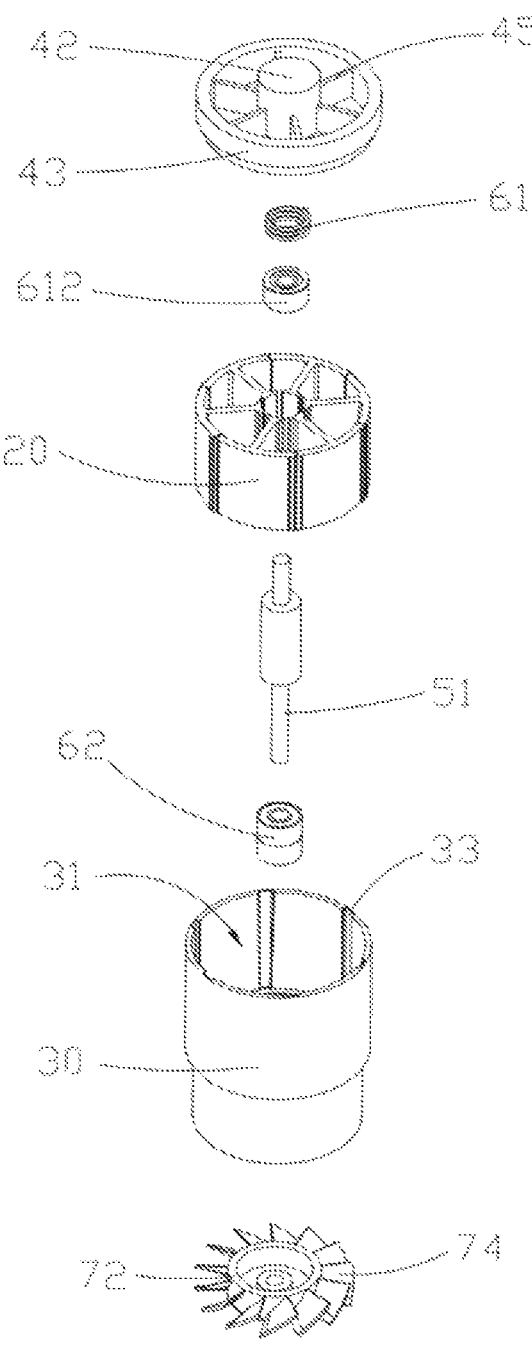
FIG. 3 is an explosion diagram of the motor in another direction as shown in FIG. 1.
Figure 4:
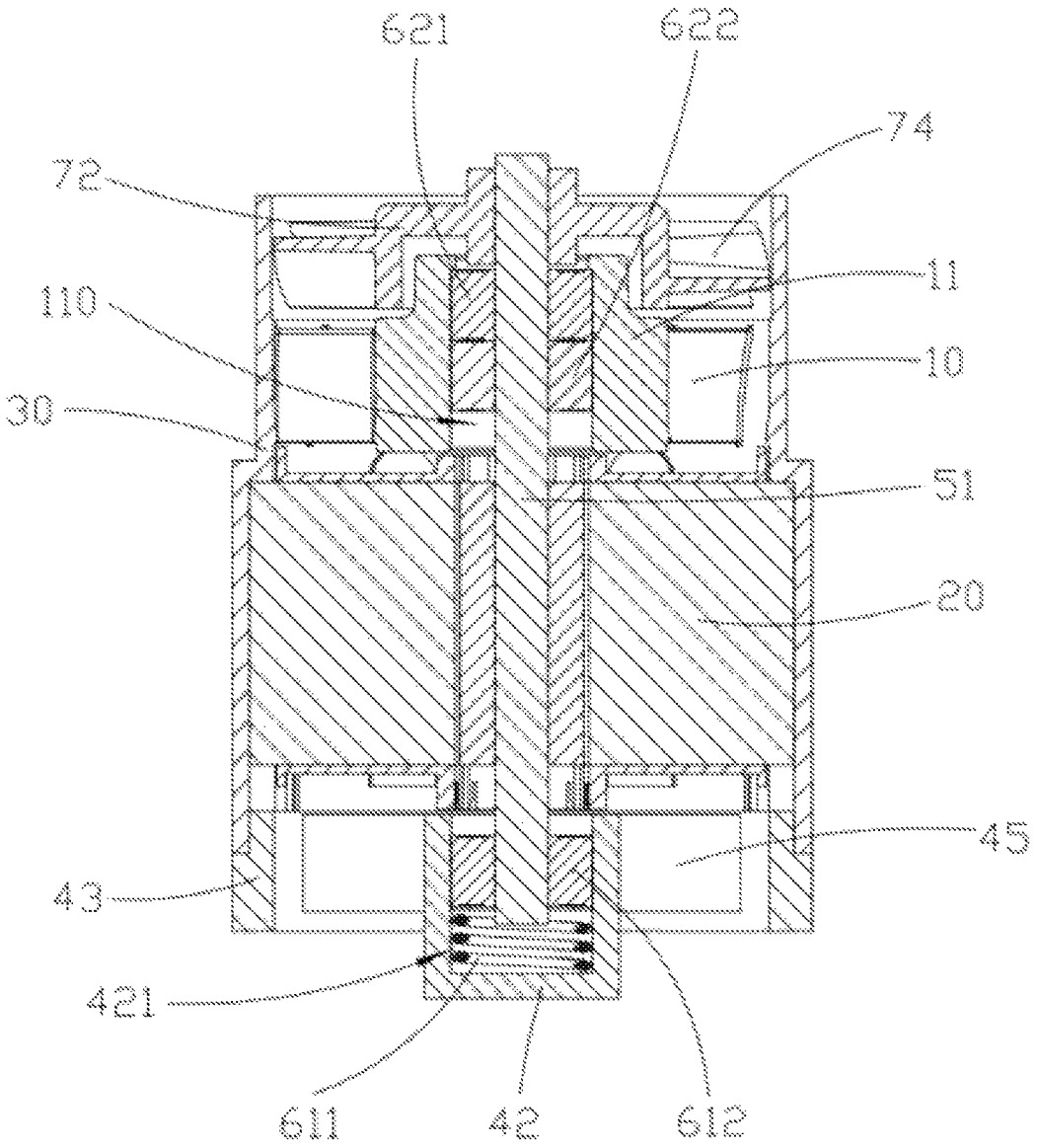
FIG. 4 is a cross-section diagram of the motor in one direction as shown in FIG. 1.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Embodiments of the present disclosure shown in the drawings will be described in detail below. When describing the accompanying drawings, unless otherwise noted, the same reference number in different drawings indicate the same or similar elements. The embodiments described below do not represent all of the possible embodiments of the present disclosure. Instead, the embodiments described below are only some devices and methods that are consistent with various aspects of invention defined by the claims.

Referring to the FIGS. 1-5, an embodiment of the present disclosure provides a motor 100, which may include an air guide member 10, a stator assembly 20, a housing 30, an air outlet member 40, a rotor 50, a preload support assembly and an impeller 70.

The air guide member 10 may include a center frame 11 and a plurality of air guide fins 12 connected to the center frame 11. The center frame 11 is generally in the shape of a cylinder, the air guide fins 12 are arranged at intervals on outer periphery of the center frame 11. Each two adjacent air guide fins 12 define a first air channel 13, thus the air guide member 10 may have a plurality of the first air channels 13, the plurality of air channels 13 form an air guide area of the motor 100.

The stator assembly 20 may include a stator yoke 21 and a plurality of stator teeth 22. The plurality of stator teeth 22 are connected to inner wall of the stator yoke 21, the stator teeth 22 are arranged at intervals along circumferential direction of the stator yoke 21. Each two adjacent stator teeth 22 define a second air channel 23, thus the stator assembly 20 may have a plurality of the second air channel 23, the plurality of second air channel 23 form a heat dissipation area of the motor 100.

The housing 30 may have a receiving cavity 31 extending through axial direction of the motor 100, the stator assembly 20 and the air guide member 10 are completely accommodated in the receiving cavity 31 of the housing. The air outlet member 40 may be located at one end of the stator assembly 20 away from the air guide member 10, the air outlet member 40 is connected to the housing 30. The outlet member 40 may include an outlet area 41. The rotor 50 may include a shaft 51, and the rotor 50 may rotatably arranged within the stator assembly 20. One end of the shaft 51 is extended from the stator assembly 20 and passed through the air guide member 10, another end of the shaft is extended from the stator assembly 20 and passed through the air outlet member 40. The air outlet member 40 may surround the another end of the shaft.

The preload support assembly may include a first preload unit 61 and a second preload unit 62 respectively located on both sides of the stator assembly 20. The first preload unit 61 and the second preload unit 62 are both connected to the shaft 51 to form opposing forces on the shaft 51 to stabilize the shaft 51.

The impeller 70 may arranged on the side of the air guide member 10 away from the stator assembly 20. The ratio of the maximum diameter d1 between the inner walls of the stator yoke 21 to the maximum outer diameter d2 of the impeller 70 is between 0.8 and 1.2. One end of the shaft 51 may pass through the air guide member 10 and connected to the impeller 70;

The air guide area, the heat dissipation area and the outlet area 41 together form the only air channel of the motor 100. When the motor 100 is running, the impeller 70 may be driven to rotate by the shaft 51, the air flow generated by the driven impeller 70 can be guide by the air guide area, then completely passes through the heat dissipation area, and flowed out from the outlet area 41.

When the motor 100 of the present application is running, the shaft 51 rotates relative to the stator assembly 20 under the interaction between the rotor 50 and the stator assembly 20, so that the impeller 70 is driven to rotate by the shaft 51. The rotation of the impeller 70 generates air flow from outside of the motor 100 into the inside of the motor 100, the air flow is guided through the air guide area, and then flows toward the stator assembly 20 and passes through the heat dissipation area, the heat generated by the stator assembly 20 is dissipated from the outlet area 41.

By setting the ratio of the maximum diameter of the inner wall of the stator yoke 21 to the maximum outer diameter of the impeller 70 between 0.8 and 1.2, under the condition that the size of the housing 30 remains unchanged, it is ensured that the diameter of the edge of the second air channel 23 is equivalent to the edge of the impeller 70, which can make the air flow completely flow to the heat dissipation area by the guiding of the air guide area to reduce the waste of wind power. It is also helps to improve heat dissipation effect of the motor and effectively increases the power of the motor.

In one embodiment, the air guide fins 12 can be arranged at least partially inclined on outer wall of the center frame 11 relative to the axial direction of the center frame 11, that is, the air guide fins 12 have a specific inclination angle relative to the out wall of the center frame 11. The inclination can be related to the direction of the air flow generated by the impeller 70, so that the air flow can easily enter the first air channel 13, and vertically enter the second air channel 23 from the first air channel 13.

Since the structural characteristics of the impeller 70, the air flow generated by the rotation of the impeller 70 has a certain rotation and a certain inclination angle, rather than flowing vertical to the inside of the motor. If not connected, the inclined air flow may generate vortices, and part of the air flow may be wasted. Therefore, the air flow passes through the air guide area formed by the inclined air guide fins 212 with specific angles, the air guide area can guide the direction of the air flow to convert the air flow into a direction parallel to axial direction of the shaft 51, so that the air flow can be flowed vertically to the heat dissipation area. That is, the air flow can be guide by the air guide area, then completely passes through the heat dissipation area, and flowed out from the outlet area.

In a specific embodiment, inclination of part of the air guide fins 12 adjacent to the impeller 70 can be greater than inclination of part of the air guide fins 12 adjacent to the stator assembly 20.

In one embodiment, the air guide member 10 and the housing 30 can be an integrally formed structure, the end of the air guide fins 12 away from the center frame 11 can be connected to inner wall of the housing 30, that is, the air guide 12 can be connected between the housing 30 and the center frame 11.

The housing 30 can be generally in shape of cylinder, inner wall of the end of the housing 30 away from the air guide member 10 can be provided with a first position part 33 along the axial direction of the housing 30, outer wall of the stator yoke 21 can be provided with a second position part 24 along the axial direction of the rotor 50. The stator assembly 20 can be positioned in the housing 30 through the nesting of the first position part 33 and the second position part 24. In an embodiment, the first position part 33 can be a position slot, the second position part 24 can be a position protrusion, the length of the position slot can be equivalent to the length of the position protrusion. The number of the first positioning part 33 and the second positioning part 24 may be multiple, which is not specifically limited in this disclosure.

In an example, length of the position protrusion can be less than or equal to length of the position slot.

In one embodiment, the first preload unit 61 and the air outlet member 40 can be arranged on the same side of the stator assembly 20. The first preload unit 61 can include an elastic member 611 and a first bearing 612, the first bearing 512 is sleeved on the shaft 51. One end of the elastic member 611 is resisted the air outlet member 40, another end of the elastic member 611 is resisted the first bearing 612. By pressing one end of the elastic member 611 against the air outlet member 40 connected to the housing 30, the elastic member 611 can exert a force toward the second preload unit 62 on the first bearing 612 and the shaft 51. The end of the second preload unit 62 away from the first preload unit 61 can be resisted, so that the second preload unit 62 can reversely exert a force toward the first preload unit 61 on the shaft 51 when the first preload unit 61 exerts a force toward the second preload unit 62 on the shaft 51, which makes rotation of the shaft 51 more stable, and improves the stability of the motor.

In a specific embodiment, the first bearing 612 can include an inner part, an outer part and balls arranged between the inner part and the outer part, the inner part can be fixed on the shaft 51, the end of the elastic member 611 can be resisted the outer part of the first bearing 612. Since the inner part and the outer part can be rotated relative to each other via the balls, the elastic member 611 can provide a force toward the second preload unit 61 by pressing the elastic member 611 against the outer part, to further improve the stability of the shaft 51.

In a specific embodiment, the second preload unit 62 and the air guide member 10 can be arranged on the same side of the stator assembly 20, the second preload unit 62 can include a second bearing 621 arranged on the shaft 51, the side of the second bearing 621 away from the stator assembly 20 can be resisted the air guide member 10. When the first preload unit 611 exerts a force on the shaft 51 and the first bearing 621, the second preload unit 62 can feedback an opposite force to the first preload unit 61, the shaft 51 can rotate more stably under the action of the two opposite forces.

Further, the second preload unit 62 can also include a third bearing 622 located on a side of the second bearing 621 facing the stator assembly 20, the third bearing 622 can be disposed adjacent to the second bearing 621. By providing two parallel bearings, while preloading the shaft 51, the bearings can further support the rotation of the shaft 51, it can further increase the stability of the motor, reduce noise and extend the life of the motor.

It should be noted, the second preload unit 62 is not limited to above structure. For example, the second preload unit 62 can also adopt the same structure as the first preload unit 61.

In a specific embodiment, the side of the center frame 11 facing the stator assembly 20 can be provided with a receiving groove 110, the second bearing 621 and the third bearing 622 can be both located in the receiving groove 110 to further increase the stability. The second bearing 621 can be disposed at the bottom of the receiving groove 110 and can be in contact with the bottom of the receiving groove 110.

In one embodiment, the air outlet member 40 can also include a center seat 42, the outlet area 41 can be distributed around the center seat 42. The side of the center seat 42 facing the stator assembly 20 can be provided with an accommodating groove 421, the elastic member 611 can be received in the accommodation groove 421, so that the end of the elastic member 611 can be firmly resisted the air outlet member 40.

Further, the air outlet member 40 can also include a shell 43 and a plurality of the support parts 45 connected between the shell 43 and the center seat 42. The shell 43 can be connected to the housing 30, the support parts 45 can be arranged at intervals along the circumferential direction of the center seat 42, each two adjacent support parts define a outlet, and multiple outlets form the outlet area 41. The support parts 45 can be arranged at equal intervals on the center seat 42, the extending direction of the support parts 45 from the center seat 42 to the shell 43 can be perpendicular to the axial direction of the shaft 51, so that the air flow can be flowed out from the air outlet area 41 more quickly without adding any negative impact. The connection means between the shell 43 and the housing 30 is not limited in this disclosure, for example, the shell 43 can be connected with the housing 30 by means of thread or snap.

In one embodiment, the impeller 70 can include a hub 72 and a plurality of blades 74. The hub 72 can be disposed on the side of the center frame 11 away from the stator assembly 20. One end of the shaft 51 can be passed through the center frame 11 and connected to the hub 72. The maximum outer diameter of the hub 72 can be equivalent to the maximum outer diameter of the center frame 11, that is, the hub 72 and the center frame 11 can roughly overlap in the axial direction of the motor. In some embodiment, the hub 72 may have a groove on one side of the hub 72 facing the center frame 11, the groove can accommodate part of the center frame 11 to reduce the distance between the impeller 70 and the air guide member 10, thereby reducing the overall volume of the motor 100.

The blade 74 can be a sheet-like structure with a curved surface, a plurality of the blades 74 can be sequentially distributed on the outside of the hub 72. In the present disclosure, the number of blades 74 is not specifically limited, and the number can be set according to actual needs.

In the axial direction of the motor 100, the blades 74 can be not overlap or rarely overlap with the center frame 11, so that the air flow generated by the blades 74 may not enter through the space where the shaft 51 passes through the center frame 11 to avoid the scattered flow of the air flow, which helps to heat dissipation efficiency of the motor.

Figure 5:
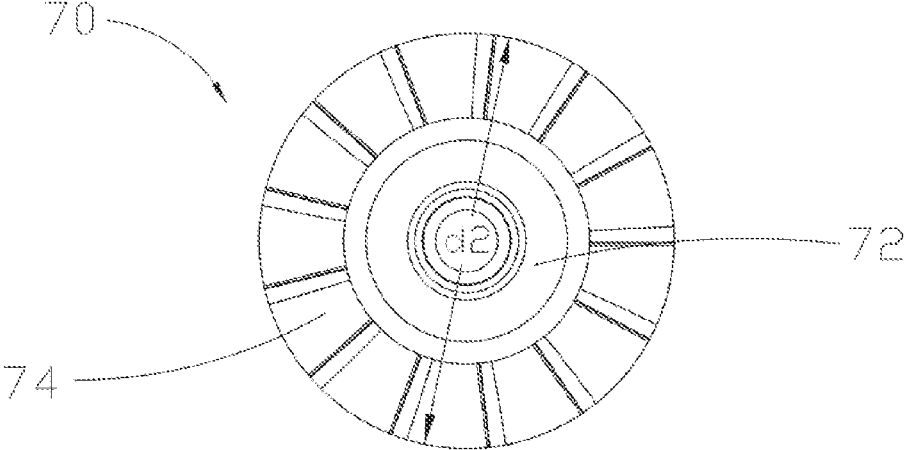
FIG. 5 is a top view diagram of the impeller, and the second air channel of the stator assembly of the motor in an embodiment.
Figure 5:
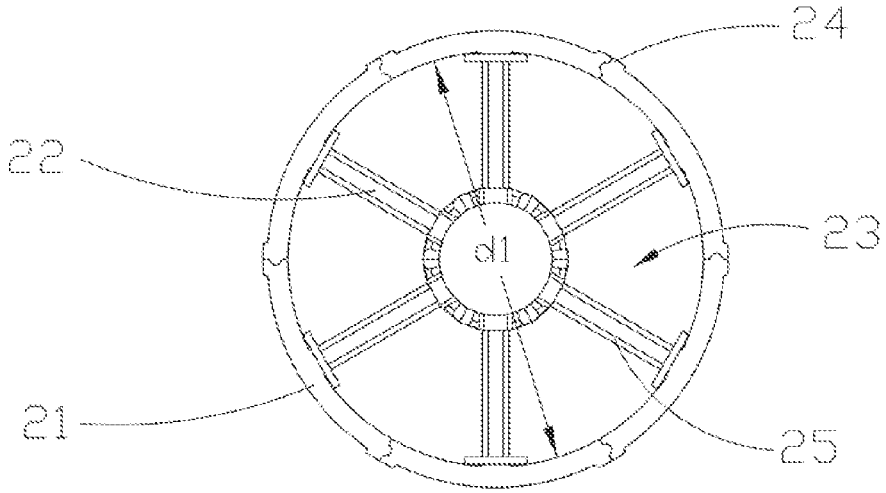
Figure 6:
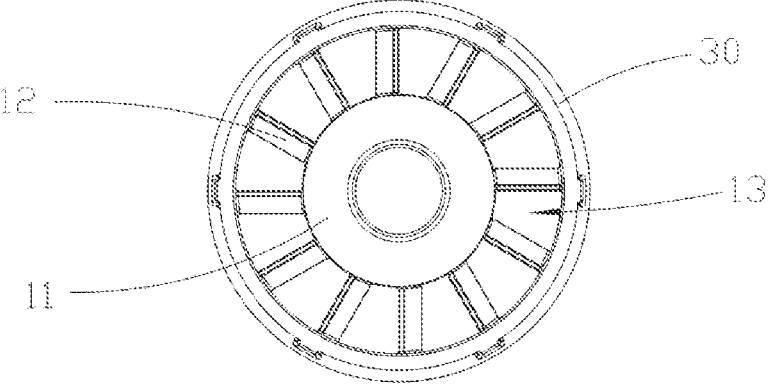
FIG. 6 is a top view diagram of the first air channel of the air guide member, and the outlet area of the motor in an embodiment.
Figure 6:
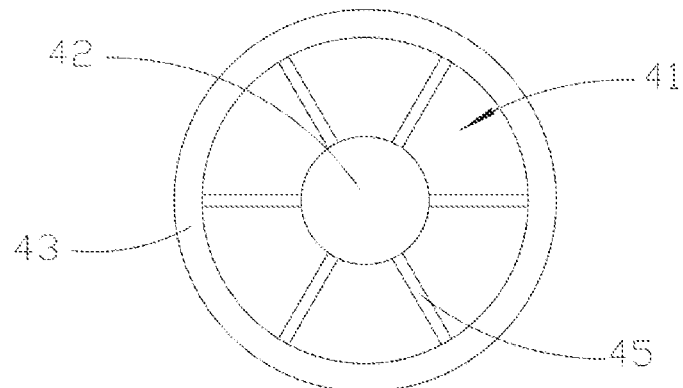

Referring to FIGS. 5 and 6, in one embodiment, the number of the stator teeth 22 can be 6, the number of the air guide fins 12 can be between 6 and 12, and the number of the support parts 45 can be between 2 and 6. By setting ratio of the number of the air guide fins 12 to the number of the stator teeth 22 between 1 and 2, the airflow generated by the impeller 70 can be effectively guided to the heat dissipation area of the stator teeth 22 from the air guide area formed by the air guide fins 12 maximumly, so that the efficiency of heat dissipation of the stator assembly 20 can be improved. By setting the ratio of the number of stator teeth 22 to the number of support parts 45 between 1 and 3, the air flow passed through the heat dissipation area can be maximized and quickly flowed from the air outlet member to realize heat dissipation of the motor.

Figure 7:
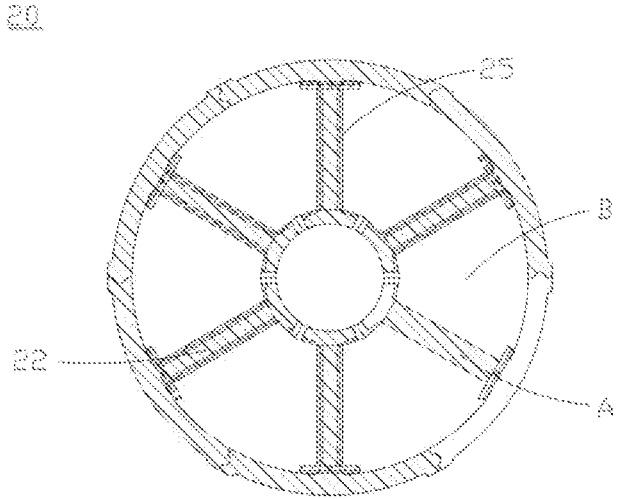
FIG. 7 is cross-section diagram of the stator assembly of the motor in an embodiment.

Referring to FIG. 7, the stator assembly 20 can also include a plurality of stator windings 25, the windings 25 can be wound around the stator teeth 22 in one-to-one correspondence. Cross-sectional area A of one stator tooth 22 wound by the stator winding 25 can be less than or equal to one-half of cross-sectional area B of flow channel formed between two adjacent stator teeth 22 wound by the stator winding 25. The cross-sectional area A refers to cross-sectional area of a stator tooth 22 wound by a stator winding 25, the cross-sectional area B refers to cross-sectional area of one flow channel (flow part) formed between two adjacent stator teeth 22. Under the above conditions, the heat dissipation area of the stator winding 25 can be maximized while maintaining the smoothness of the air channel of the motor, so that the size of the flow channel of the stator assembly can be increased within a reasonable space to improve heat dissipation efficiency.

In one embodiment, ratio of length of the stator teeth 22 along the radial direction of the stator yoke 21 to width of the stator windings 25 along the circumference of the stator yoke 21 can be greater than or equal to 2, so that the size of the motor 100 can be increased in a reasonable space.

The traditional airflow of motor may only pass through the periphery of the stator assembly and transfer heat by silicon steel sheets in the stator assembly. When the motor is working, the heat generated by the stator windings may be conducted to the silicon steel sheets, and conducted to metal outer shell from the silicons sheets. The airflow of the motor can only cool the metal outer shell, the traditional heat reduction route requires several layers to complete heat dissipation, and the heat dissipation efficiency is very low. In the present disclosure, the air flow can directly pass through the stator windings of the stator assembly, since the first heat source of the motor is the stator winding, and the stator winding is directly exposed to the air channel in the heat dissipation area, the heat dissipation efficiency of the motor in the present disclosure is much higher than that of traditional motor, that is, the stator winding in the present disclosure can be carried greater current and power, and can also be maintained within a working temperature range.

The present disclosure may also provide a blow device, the motor 100 can be installed in the blow device, the motor 100 can drive the working module of the blow device to realize the normal operation of the blow device. The details of the blow device in the present disclosure is not limited, for example, the blow device can be a dryer, such as a hair dryer, a hand dryer, etc.

The above embodiments further illustrate the contents of the present application, but should not be construed as limiting the present application. Without departing from the spirit and essence of the present application, modifications and substitutions made to the methods, steps or conditions of the present application all fall within the scope of the present application. Unless particularly specified, the technical means used in the embodiments are conventional means well known to those skilled in the art.

What is claimed is:

1. A motor comprising:

an air guide member having a center frame and a plurality of air guide fins arranged at intervals on outer periphery of the center frame, each two adjacent air guide fins define a first air channel, a plurality of the first air channels form an air guide area;

a stator assembly having a stator yoke and a plurality of stator teeth, the stator teeth are connected to inner wall of the stator yoke and are arranged at intervals along circumferential direction of the stator yoke, each two adjacent stator teeth define a second air channel, a plurality of the second air channels form a heat dissipation area;

a housing having an receiving cavity extending through axial direction of the motor to receive the stator assembly and the air guide member;

an air outlet member located at an end of the stator assembly away from the air guide member and connected to the housing, the air outlet member having an outlet area;

a rotor rotatably arranged within the stator assembly, the rotor having a shaft, one end of the shaft is extended from the stator assembly and passed through the air guide member, another end of the shaft is extended from the stator assembly and passed through the air outlet member;

a preload support assembly having a first preload unit and a second preload unit respectively located on both sides of the stator assembly, the first preload unit and the second preload unit are both connected to the shaft to form opposing forces; and an impeller arranged on the side of the air guide member away from the stator assembly and connected to the shaft, wherein the ratio of the maximum diameter of the inner wall of the stator yoke to the maximum outer diameter of the impeller is between 0.8-1.2;

wherein the air guide area, the heat dissipation area and the outlet area together form an only air channel of the motor, air flow generated by the driven impeller is guided by the air guide area and completely passed through the heat dissipation area, and flowed out from the outlet area;

wherein the first preload unit and the air outlet member are arranged on the same side of the stator assembly, the first preload unit includes an elastic member and a first bearing arranged on the shaft, one end of the elastic member is resisted on the air outlet member, another end of the elastic member is resisted on the first bearing;

wherein the air outlet member comprises a center seat, shell and a plurality of support parts connected between the shell and the center seat, each two adjacent support parts define a outlet, the number of the stator teeth is 6, the number of air guide fins is between 6 and 12, and the number of support parts is between 2 and 6.

2. The motor of claim 1, wherein the first bearing comprises an inner part, an outer part and balls arranged between the inner part and the outer part, the inner part is fixed on the shaft, the end of the elastic member is resisted on the outer part.

3. The motor of claim 1, wherein the air outlet member comprises a center seat, the outlet area is distributed around the center seat, the side of the center seat facing the stator assembly is provided with an accommodating groove, the elastic member is received in the accommodation groove.

4. The motor of claim 3, wherein the air outlet member comprises a shell connected to the housing and a plurality of support parts connected between the shell and the center seat, the support parts are arranged at intervals along the circumferential direction of the center seat, each two adjacent support parts define a outlet, a plurality of the outlets form the outlet area.

5. The motor of claim 4, wherein the shell is connected with the housing by means of thread or snap.

6. The motor of claim 1, wherein the second preload unit and the air guide member are arranged on the same side of the stator assembly, the second preload unit includes a second bearing arranged on the shaft, the side of the second bearing away from the stator assembly is resisted on the air guide member.

7. The motor of claim 6, wherein the second preload unit comprises a third bearing located on a side of the second bearing facing the stator assembly, the third bearing is disposed adjacent to the second bearing along the axial direction of the shaft.

8. The motor of claim 7, wherein a receiving groove is opened on side of the center frame facing the stator assembly, the second bearing and the third bearing are both located in the receiving groove.

9. The motor of claim 1, wherein the stator assembly comprises a plurality of stator windings around the stator teeth in one-to-one correspondence, cross-sectional area of one stator tooth wound by the stator winding is less than or equal to one-half of cross-sectional area of flow channel formed between two adjacent stator teeth wound by stator winding.

10. The motor of claim 1, wherein a first position part is arranged on inner wall of the end of the housing away from the air guide member, a second position part is arranged on outer wall of the stator yoke, the stator assembly is positioned in the housing through the nesting of the first position part and the second position part.

11. The motor of claim 10, wherein the first position part is a position slot which is arranged along axial direction of the housing, the second position part is a position protrusion which is protruding along the axial direction of the rotor.

12. The motor of claim 11, wherein length of the position protrusion is less than or equal to length of the position slot.

13. The motor of the claim 1, wherein the air guide fins are arranged at least partially inclined on outer wall of the center frame relative to the axial direction of the center frame.

14. The motor of claim 13, wherein inclination of part of the air guide fin adjacent to the impeller is greater than inclination of part of the air guide fin adjacent to the stator assembly.

15. The motor of claim 13, wherein the air guide member and the housing are integrated, end of the air guide fin away from the center frame is connected to inner wall of the housing.

16. The motor of claim 1, wherein the housing comprises a first housing part configured to accommodate the air guide member and a second housing part configured to accommodate the stator assembly, the outside diameter of the first housing part is less than the outside diameter of the second housing part.

17. The motor of claim 1, wherein the stator assembly comprises a plurality of the stator windings wound around the stator teeth in one-to-one correspondence, ratio of length of the stator teeth along the radial direction of the stator yoke to width of the stator windings along the circumference of the stator yoke is greater than or equal to 2.

* * * * *